Patented Apr. 13, 1937

2,077,009

UNITED STATES PATENT OFFICE 2,077,009

RESIN PRODUCTION

Joseph Rivkin, Pittsburgh, Pa., assignor to The Neville Company, a corporation of Pennsylvania No Drawing. Application December 9, 1935, Serial No. 53,514

8 Claims. (Cl. 260—7)

This invention relates to a method of producing products of resinous nature, from a starting material consisting in large proportion of liquid hydrocarbons containing reactive bodies polymerizable to form resins.

While the production of resinous products from an operation involving simultaneous polymerization and reaction involving a phenol in a mixture of hydrocarbons and phenols has been described in patents, and in the literature, and whereas such products have to some extent been rendered commercially available, problems of substantial moment have remained in the manufacture of such products, generally considered, while recovering as a result of the process employed products of high quality having desirable characteristics.

I have succeeded in producing by an efficient process, and at commercially practicable cost, a hard resin formed by simultaneous polymerization and reaction involving the polymerizables contained in hydrocarbon liquids and a phenol, or phenolic substance, which hard resin is alcohol soluble and is compatible with nitrocellulose. I have also succeeded, in a process of such practical nature, in simultaneously producing a very soft fluid resin, comprising products of phenol reaction and of polymerization, which, when heated, is a solvent for cellulose acetate, and which has other peculiar and valuable properties.

In addition to certain procedural relationships involved in my method, I have discovered that an activated clay, of the type usually employed as a color absorbent, is capable, under the conditions which I establish, of acting in peculiarly desirable manner, both to promote the progress of polymerization and simultaneously to promote the progress of phenol reaction.

Briefly and generally to describe the preferred procedure under my process, I take a hydrocarbon liquid, of the type exemplified by crude solvent naphtha, and with this I commingle a phenol. The mixture is warmed to a moderately elevated temperature, and activated clay is added as an agent producing both polymerization and phenol reaction in the mixture. Throughout a relatively extended period of time, the mixture containing the activated clay is agitated while being maintained within a range of moderately elevated temperature.

At the conclusion of the reaction period, the reacted liquid is freed of the clay by a simple filtration step; and the inert liquid refined by the reaction, together with any unreacted phenolic content, is distilled off. The residual product of distillation is a soft resin which, by steam distillation, or in other suitable manner, may be separated into a hard resin and a very soft fluid resin.

I shall now give detailed examples of typical runs conducted in accordance with my invention.

Example No. 1

Twenty gallons of No. 2 crude solvent naphtha, containing 60% of reactives, was introduced, together with 5 gallons of cresol ($C_7H_8O$), into a vessel having closed circulating coils for both heating and cooling fluids.

Activated clay of high particle porosity was added in a quantity by weight equal to 6% the weight of the blend of naphtha and cresol, and during agitation the temperature of the blend was raised to between 90° C. and 100° C. While maintaining a temperature in the neighborhood of 100° C., the mixture was agitated for a period of approximately four hours. At the expiration of that treating period the maximum possible reaction appeared to have been effected.

The reacted mixture was first filtered to remove the activated clay, and was then subjected to an initial distillation during which there was distilled off refined naphtha and any unreacted cresol. The residual product of the distillation was a soft, somewhat tacky, resin. By steam distillation this soft resin was separated into a hard resin and a fluid resin, or heavy resinous oil.

The hard resin, thus obtained, had a melting-range of 85° C. to 95° C. It was clear, and was of a light color, falling within the color range termed in the trade from a 1½ color to a 3 color. It possessed good solubility in isopropanol, ethanol, and other solvent alcohols, as well as in the common hydrocarbon solvents. It was found to be compatible with nitrocellulose.

The heavy resinous oil, thus obtained, was of 1.095 specific gravity, and was more viscous than the generally similar oil obtained by a simple polymerization of the reactives in crude solvent naphtha. This fluid resin was found to be soluble in alcohols, as well as in the common hydrocarbon solvents, and when heated was found to be itself a solvent for cellulose acetate.

Example No. 2

Crude solvent naphtha, containing 30% of reactives, was mixed with cresol. The proportion of admixture was 89% by volume of the crude solvent naphtha to 11% by volume of cresol. Clay in a quantity equal to 3% the combined weight of the crude naphtha and the cresol was added, and the mixture was agitated for 4 hours, at a temperature between 90° C. and 100° C.

Recovery was made in accordance with the procedure of Example No. 1.

The fluid resin showed qualities substantially identical with those of the fluid resin obtained in Example No. 1, having good solubility in alcohols, as well as in the common hydrocarbon solvents, and being itself, when heated, a solvent for cellulose acetate. The hard resin possessed satisfactory solubility in the solvent alcohols, and mixtures of the solvent alcohols, such as ethanol, isopropanol, methanol, butanol, and the like, as well as in the common hydrocarbon solvents. The hard resin was found to have a melting-range of approximately 85° C. to 95° C. It was found to be compatible with nitrocellulose.

*Example No. 3*

This example follows closely the procedure of Example No. 1, save that phenol ($C_6H_6O$) was used, in place of cresol, in making up the reactive blend. The proportion of crude solvent naphtha, containing 60% reactives was, as in Example No. 1, 80% by volume of the blend, the remaining 20% being phenol.

The hard resin possessed satisfactory solubility in the solvent alcohols, and in mixtures of the solvent alcohols, such as ethanol, isopropanol, methanol, butanol, and the like, as well as in the common hydrocarbon solvents. It was found to have a melting-range of 85° C. to 95° C., and to be compatible with nitrocellulose. The soft fluid resin was found to be soluble in the solvent alcohols and hydrocarbon solvents, and to be itself, when heated, a solvent for cellulose acetate.

*Example No. 4*

In this example, the reaction mixture was made up of 80 parts by weight of crude solvent naphtha, containing 60% of reactives, and 20 parts by weight of $\alpha$-naphthol. The reaction was effected under conditions closely similar to those under which the reaction in Example No. 1 was conducted, the blend of crude solvent naphtha and $\alpha$-naphthol being agitated with 6% its weight of activated clay for a period of approximately 4 hours, at a temperature of between 90° C. and 115° C. Recovery was effected as in Example No. 1.

The residual products of the reaction were a hard resin and a soft fluid resin. The hard resin was found to have a melting-range of from 90° C. to 100° C. It was found to have satisfactory solubility in the solvent alcohols, and in mixtures of the solvent alcohols such as ethanol, isopropanol, methanol, butanol, and the like, as well as in the hydrocarbon solvents. It was found to be compatible with nitrocellulose. The soft, fluid resin was found to be soluble in the solvent alcohols and to be itself, when heated, a solvent for cellulose acetate to a certain extent.

*Example No. 5*

In this example, 4 parts by weight of No. 2 crude solvent naphtha, containing 60% of reactives, was introduced together with 1 part by weight of resorcinol into a vessel having closed circulating coils for both heating and cooling fluids. The temperature was now raised by a circulation of steam to between 120° C. and 130° C. Under the above temperature conditions, and while agitating the mixture, activated clay equal to 6% by weight of the weight of the blend of naphtha and resorcinol was added. Temperature control was effected by a slow, controlled rate of clay addition, instead of by circulation of a cooling fluid. The total period of reaction was 4 hours.

The residual products of this reaction are a hard resin, and a soft resin, removable from the hard resin by steam distillation or vacuum distillation. The hard resin has a melting-range of 95° C. to 105° C. and possesses satisfactory solubility in solvent alcohols, and in mixtures of solvent alcohols, such as ethanol, isopropanol, methanol, butanol, and the like, as well as in the hydrocarbon solvents. The soft resin obtained from the reaction is also soluble in solvent alcohols, and in hydrocarbon solvents, and possesses, when heated, a certain solvent power on cellulose acetate. It has a melting-range of from 40° C. to 50° C.

Examples 1, 2, 3, 4, and 5 involved the use of a crude solvent naphtha, in which the polymerizable content consisted preponderantly of coumarone and indene, so that the resultant products may be considered coumarone-indene products modified in varying degree by the presence of a phenol in the reaction mixture, and the participation of the phenol in the reaction. In order more fully to exemplify my process, I have utilized as the hydrocarbon liquid of the reaction mixture a crude solvent naphtha, the polymerizables of which consisted preponderantly of dicyclopentadiene.

*Example No. 6*

Taking a crude solvent naphtha, in which the reactives consisted preponderantly of dicyclopentadiene, rather than coumarone and indene, and in which the crude contained approximately 80% of reactives, I mixed this crude in equal volumes with cresol, and added activated clay in the proportion of 6% the weight of the blend. The reaction mixture was agitated for 4 hours at a temperature of from 80° C. to 138° C. Generally considered, the reaction procedure, and the recovery procedure, were in accordance with those given in Example No. 1.

The residual products were a hard resin, having a melting-range of approximately 85° C. to 95° C. and a soft fluid resin or resinous oil. The hard resin exhibits good solubility in the hydrocarbon solvents, and some solubility in the solvent alcohols, and mixtures of the solvent alcohols, such as isopropanol, butanol, ethanol, and the like. The soft fluid resin is soluble in the solvent alcohols and hydrocarbon solvents, and is itself, when heated, a solvent for cellulose acetate.

*Discussion*

The residual resinous products obtained from my process possess certain particular utility. As included in varnishes they exert an antiskinning effect, and exert a mild gas-proofing effect when included in China-wood oil and China-wood oil varnish. They have a gel-retarding effect in the process of cooking China-wood oil varnish, and generally exert a gel-retarding effect on China-wood oil. They are particularly desirable materials for use in the compounding of rubber, in which use they serve as a dispersing agent and plasticizing ingredient. Varnishes in which advantage is taken of the desirable effects of a phenol-modified resin of this sort are disclosed and claimed in my co-pending application Serial No. 89,769, filed July 9, 1936. A cellulose acetate solution in the fluid, phenol-modified product comprising lower polymers is disclosed and claimed in my co-pending application Serial No. 113,011, filed November 27, 1936.

It may be stated as a fact that, although the solubility of the resin produced by my process varies with the reactivity of the phenols, or phenolic substances, utilized as ingredients of the reaction mixture, both the hard and fluid resins obtained as residual products possess higher solubility, generally considered, than resins produced by a reaction in a mixture of crude solvent naphtha and a phenol, or phenolic substance, in which the agent promoting polymerization and condensation is sulphuric acid, a sulphonic acid, or a halide. The use of activated clay, rather than an acid or a halide, as the reactivating agent of the process, is also of great practical importance in conducting a resin-producing process on a commercial scale, since it avoids the necessity for conducting the difficult and laborious steps of neutralization and washing, which are attendant upon the use of an acid reactivating agent.

It may further be noted that my process, involving the use of activated clay, lends itself to the simultaneous production of a hard resin of good quality and having valuable characteristics, and of a soft fluid resin, which latter has the property of dissolving cellulose acetate, and which has various other properties rendering it useful in the arts.

Giving consideration to the hydrocarbon liquids, used as an ingredient of the reaction mixture in conducting my process, there has been described conscious admixture of a phenolic substance with a hydrocarbon liquid containing resin-forming polymerizables. It is to be understood, however, that some hydrocarbon liquids containing such reactives also contain phenols, or phenolic substances, in substantial proportion. Such crudes present, in accordance with their phenolic content and percentage of polymerizables, the effects obtainable by adding a phenolic substance to a liquid hydrocarbon containing polymerizable reactives. When obtainable in quantity adequate to minimize the necessity for repeated preparatory analysis, such hydrocarbon liquids having a phenolic content may desirably be used commercially in my process, either by themselves, or by including in the reaction mixture an additional proportional content of a phenolic substance.

While crude solvent naphtha, of the sort containing coumarone and indene as its polymerizable reactives, suggests itself primarily as the hydrocarbon liquid forming an ingredient of the reaction mixture, the process may be practiced without substantial change upon hydrocarbon liquids containing polymerizable reactives of different type. The example, given above, of the process as practiced upon a reaction mixture comprising a crude solvent naphtha, which includes dicyclopentadiene as its preponderantly reactive content, illustrates the generality with which my process, utilizing activated clay as a reactivating agent, may be practiced. The dicyclopentadiene crude is illustrative of a general type of polymerizables which is to be found in the petroleum-derived hydrocarbons, as well as in coal-derived hydrocarbons.

As to the practice of my process, involving the use of activated clay as a reactivating agent, it may be stated that the clay is effective in promoting a reaction involving the phenols, throughout the class of phenolic substances generally, including the phenols proper, the phenolic acids, and in general such aromatic compounds as contain one or more hydroxyl groups attached to the organic nucleus, and to their homologues and substitution products. Such definition is, therefore, to be given to the term "phenolic substance" as used herein. It is also to be understood that in my process a mixture of phenolic substances is contemplated. I prefer to use one or more of the more commercially practicable phenols, such as cresol or phenol.

Considering further variations in my process, while steam distillation specifically has been employed in the procedure given in most examples, for the purpose of separating the hard resin and the soft fluid resin obtained as residual resinous products, it is to be understood that vacuum distillation may be alternatively employed. Also, for the crude solvent naphtha which contains coumarone and indene preponderantly as its polymerizable reactives, a general proportional relationship between the hydrocarbon liquid and the phenolic substance runs through the various examples. The proportions given are not, however, to be taken as establishing limitations, since the exemplary proportions are subject to relatively wide variation.

Resort may be had to various expedients, other than a circulation of cooling fluid, to temper the resin-producing reaction. For example, the activated clay may be fed in slowly, or as a suspension in a portion of the blend, or in a portion of either the hydrocarbon liquid or the phenol. Also, a mixture may be made of the clay and phenol, and the naphtha fed slowly to this catalytically prepared mixture. The inclusion of activated clay has been given as 6% the total weight of blend through which it is commingled throughout the majority of the examples. While the ratio of clay to blend may be varied, 6% has, under most conditions, been found adequate to promote the resin-forming reactions.

I have found it desirable, when practicing my invention under the simple conditions above given, to utilize a moderately elevated temperature for promoting the reaction, while avoiding temperature conditions of such severity as to cause substantial vaporization of any of the components of the reaction mixture. Temperatures in the neighborhood of 100° C., plus or minus, have been found in general desirable, as adequately accelerating the reaction without causing vaporization of any component of the reaction mixture to a substantially disadvantageous extent.

By carrying out the reaction under reflux conditions, the temperature under which the reaction is effected is not limited by the necessity for avoiding vaporization of any portion of the reaction mixture. Under such circumstances, temperature limitation resides merely in the color requirements attendant upon the particular use to which the resinous products of the process are to be put. I have found it desirable, when utilizing as the phenolic ingredient of the reaction mixture a phenolic substance substantially less active than those specifically included in the examples given above, to conduct the process under reflux conditions, so that the reactivating effect of the activated clay may be supplemented by the reaction-promoting effect of higher temperature conditions.

Referring further to a procedure in accordance with my process, in which one of the less active phenolic substances is included in the reaction mixture, I have found it also desirable in such case to subject such phenolic substance, in the presence of a limited quantity of hydrocarbon-contained polymerizables, to the effect of heat and the activated clay during the initial stage of the reaction step, and to add the bulk of the hydrocarbon liquid gradually. This is for the reason that the progress of polymerization tends to crowd aside the progress of phenolic involvement, and it is, therefore, desirable to conduct the reaction under conditions particularly favorable to reaction involving the phenol or phenolic substance.

It has been noted above that the use of activated clay, as an agent promoting polymerization and condensation, is of great practical advantage in simplifying the recovery steps of a resin-producing process. This is primarily because the activated clay, being solid, may be wholly filtered from the reacted liquid prior to separation of the components in the reacted liquid mixture. Removal of the clay leaves a reacted liquid mixture containing substantially no foreign non-volatile ingredients, and upon which, therefore, special purification steps need not be practiced. The problem of avoiding emulsification during neutralization or washing is, therefore, wholly avoided. Considering my process as a resin-producing process, in which refined solvent naphtha, as well as residual resins, is recovered as a valuable product, it may be noted that the gravity of the refined solvent naphtha recovered is substantially higher than that obtained by a simple polymerization in crude solvent naphtha.

I claim as my invention:

1. In a process of producing a modified resin having solubility in alcohol the herein disclosed steps of including with crude solvent naphtha having polymerizable reactives a phenolic substance in quantity of the latter adequate as involved in resin-forming reactions with the polymerizable reactives of the crude solvent naphtha to impart to the resultant resin the quality of solubility in alcohol, and effecting resin-forming reactions involving the reactives of the crude solvent naphtha and the phenolic substance by the catalytic action of activated clay in sufficient quantity to promote the reactions under suitable conditions of agitation and temperature.

2. In a process of producing modified resin having solubility in alcohol in accordance with the definition of claim 1 a resin-forming step in which the phenolic substance of the reaction mixture is cresol.

3. In a process of producing modified resin having solubility in alcohol in accordance with the definition of claim 1 a resin-forming step in which the phenolic substance of the reaction mixture is phenol.

4. In a process of producing a modified resin having solubility in alcohol the herein disclosed steps of including with crude solvent naphtha containing preponderantly coumarone and indene as its polymerizable reactives a phenolic substance in quantity of the latter adequate as involved in resin-forming reactions with the polymerizable reactives of the crude solvent naphtha to impart to the resultant resin the quality of solubility in alcohol, and effecting resin-forming reactions involving the reactives of the crude solvent naphtha and the phenolic substance by the catalytic action of activated clay in sufficient quantity to promote the reactions under suitable conditions of agitation and temperature.

5. In a process of producing a modified resin having solubility in alcohol in accordance with the definition of claim 4 a resin-forming step in which the phenolic substance of the reaction mixture is cresol.

6. In a process of producing modified resin having solubility in alcohol in accordance with the definition of claim 4 a resin-forming step in which the phenolic substance of the reaction mixture is phenol.

7. In a process of producing a modified resin having solubility in alcohol the herein disclosed steps of including with crude solvent naphtha containing preponderantly dicyclopentadiene as its polymerizable reactive a phenolic substance in quantity of the latter adequate as involved in resin-forming reactions with the polymerizable reactives of the crude solvent naphtha to impart to the resultant resin the quality of solubility in alcohol, and effecting resin-forming reactions involving the reactives of the crude solvent naphtha and the phenolic substance by the catalytic action of activated clay in sufficient quantity to promote the reactions under suitable conditions of agitation and temperature.

8. In a process of producing a modified resin having solubility in alcohol in accordance with the definition of claim 7 a resin-forming step in which the phenolic substance of the reaction mixture is cresol.

JOSEPH RIVKIN.